Sept. 27, 1955      J. J. BOCCHINO      2,718,714

DEVICE FOR DRYING WASHED MILK AND BEVERAGE BOTTLE CARRIERS

Filed June 14, 1951

INVENTOR.
JOSEPH J. BOCCHINO
BY
ATTORNEYS

United States Patent Office 2,718,714
Patented Sept. 27, 1955

2,718,714
DEVICE FOR DRYING WASHED MILK AND BEVERAGE BOTTLE CARRIERS

Joseph J. Bocchino, Dover, N. J.

Application June 14, 1951, Serial No. 231,471

1 Claim. (Cl. 34—236)

This invention relates to a device for drying milk and beverage bottle carriers or cases, boxes, cans, crates and other types of containers for the dairy, beverage and food industries after being washed.

In applicant's copending application, Serial Number 165,936, filed June 3, 1950, there was described and illustrated two forms of a device for washing milk and beverage bottle cases, boxes, cans, and other types of containers for the dairy, beverage, and food industries. In each form, the carriers to be washed are transported by an endless belt through the open ends of a structure, the bottom of the structure being open and supported above two open top tanks, one of the tanks containing a cleansing liquid and the other a rinsing liquid. The liquid is pumped from each tank into a series of interconnected pipe frames mounted over the tank. The endless belt transports the carriers through each series of frames and between the jets of the liquid forced from inwardly directed outlets in the frames. In the first form of the washing device, the washing operation is aided by the application of reciprocal motion to pivotally mounted frames. In the device of the second form, the frames are made longitudinally and reciprocally slidable in the structure. Subsequently, it was found desirable to incorporate a drying unit with the washing unit which improvement is the subject matter of this application.

It is an object of the instant invention to provide a more thorough cleaning operation on the carriers than heretofore possible.

Another object is to further safeguard the health of the community.

Other objects of the instant invention will become apparent in the course of the following specification.

In the attainment of these objectives, a drying unit is mounted adjacent the delivery end of the washing unit described in detail in the aforementioned patent application, Serial Number 165,936. The drying unit is constituted of a blower, a flexible hose, and a head interconnected with the blower by the hose. The head directs air streams from the blower over the carriers when emerging from the washing unit. To increase the efficiency of the drying unit, the angles at which the air currents from the head are directed toward the carriers are varied.

Figure 1:
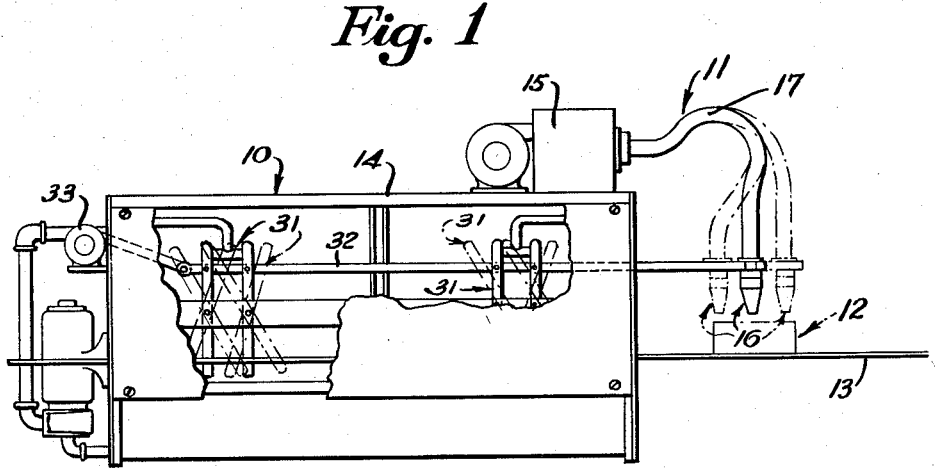
Figure 1 is a side elevational view of the drying unit constructed in accordance with the principles of this invention, the drying unit being shown in connection with the washing unit with which it is operated.
Figure 2:
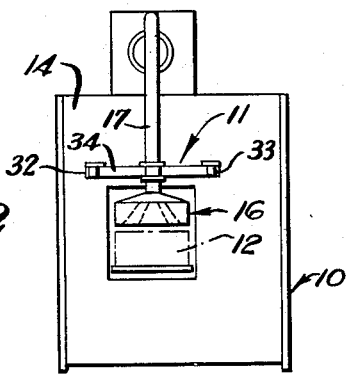
Figure 2 is a right end elevational view of the blower and washing units shown in Figure 1.
Figure 3:
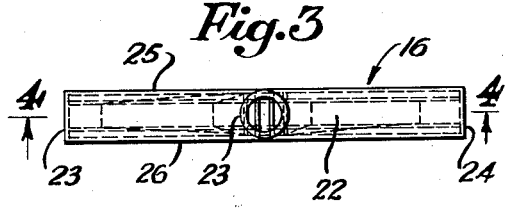
Figure 3 is a plan view of the head of the drying unit shown in Figure 1 but on an enlarged scale.

Referring now in greater detail to the drawings where like reference numerals indicate like parts, reference numeral 10 indicates the washing unit, 11 the drying unit, and 12 the carriers or cases being cleaned or processed by the washing and drying units.

The washing unit 10 is described in detail in applicant's copending application, Serial Number 165,936, previously mentioned. By way of review, in that application the carriers 12 (Fig. 1 of subject application) are transported by an endless belt 13 through openings in the ends of a superstructure 14. The superstructure is positioned above two open tanks, one of which contains a cleansing liquid and the other a rinsing liquid. As the belt transports the carriers into the superstructure first over the tank with the cleansing liquid, that liquid is pumped from the tank into a series of interconnected pipe frames through which the belt and carriers pass, the pipe frames directing the liquid over the carriers to remove the foreign matter. After passing through the pipe frames over the first tank, the carriers are transported by the belt between another series of inter-connected pipe frames from which the liquid from the rinsing tank is forced to complete the washing operation. In the first form of the washing unit, as illustrated and described in the copending application, the pipe frames over both tanks were pivotally mounted at the bottom and reciprocally operated by a driving rod. In the second form of the washing unit, each series of pipe frames were made longitudinally reciprocal in the superstructure.

As the carriers are moved by the belt through the delivery end of the superstructure there will remain thereon excess rinsing liquid which if not promptly removed may accumulate more foreign matter. To remove the excess liquid by evaporation, the drying unit 11, the subject matter of this application, has been incorporated with the washing unit.

The drying unit 11 is constituted of a blower 15, a head or hood 16, and a flexible hose 17.

The blower 15 is of known type in which a fan (not shown) actuated by a motor creates a current of air which is expelled through an outlet.

Figure 4:
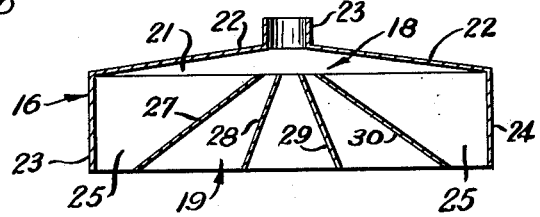
Figure 4 is a sectional view of the head along line 4—4 of Figure 3.
Figure 5:
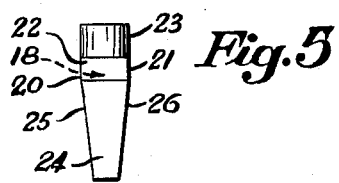
Figure 5 is an end view of the head shown in Figure 3.

The head or hood 16 is an elongated open bottom device having an upper chamber 18 communicating with a lower chamber 19 (Figs. 4 and 5). The upper chamber 18 is formed with the spaced parallel upper side members 20 and 21 (Figs. 5 and 4) which are substantially of triangular shape as illustrated. Over the corresponding upper edges of the side members is a top member 22 which extends downwardly and outwardly to the ends of the side members (Fig. 4). The top and upper side members may be integrally or otherwise formed along corresponding edges. Through the top member 22 substantially at the apex or center, a nipple 23 is inserted and upwardly directed therefrom for the attachment of the later described flexible hose 17.

The lower chamber 19 is constituted of the spaced parallel end members 23 and 24 (Figs. 4 and 5), the side edges of which taper inwardly and downwardly as will be most clearly seen in Figure 5. Integrally formed with or otherwise attached along the corresponding edges of the end members are the lower side members 25 and 26.

Disposed between the inner surfaces of the lower side members 25 and 26 are the radially directed air deflectors or baffles 27, 28, 29, and 30 (Fig. 4). It will be noted that the deflectors are spaced apart at both the top and bottom and if extended upwardly at the top will meet in a line perpendicular to the center line of the nipple 23 and in the upper chamber 18. The deflectors divide the lower chamber into a plurality of radially directed compartments.

The head or hood 16 is attached to the washing unit 10 in the following maner. As explained in detail in applicant's copending application, Serial No. 165,936, the reciprocal pipe frames 31 (Fig. 1 of subject application) are reciprocated by a driving rod 32 in operable engagement with a prime mover 33 through known reciprocating mechanism. Whether the pipe frames are pivotally reciprocal or longitudinally reciprocal, a driving rod 32 is used to give the desired motion to the frames and there need be only one driving rod. For the support of the head 16 of the drying unit, the driving rod 32 is extended through the delivery end of the washing unit. On the side of the frames opposite the driving rod, another rod 33 is pivotally attached in a horizontal plane in which the driving rod 32 is also situated. The outer end of the rod 33 is also extended through the same end of the washing unit as the driving rod 32. Transversely disposed between the extended ends of the rods 32 and 33 is a cross member 34 which may be attached in any known manner. The nipple 23 of the head 16 is then attached in any suitable manner to the cross member 34 with the open bottom of the head downwardly directed toward and transversely of the belt 13 and the carriers 12 transported thereon.

A flexible hose 17 of any suitable material is then connected between the outlet of the blower 15 and the inlet of the head 16, that is, the free end of the nipple 23.

In operation:

The carriers 12 are placed on the belt 13 at the entrance end of the washing or spraying unit 10 (below the prime mover 33, Fig. 1), the belt transporting the carriers first between the pipe frames directing sprays of a cleansing liquid against the carriers. As the carriers leave the cleansing portion of the washing or spraying unit, the belt continues to transport the carriers through other pipe frames from which a rinsing liquid is forced. Flexible baffles in contact with many surfaces of the carriers remove a large amount of the excess liquids therefrom. However, to thoroughly dry the carriers, the head 16 of the drying unit 11 is attached between two driving rods or a driving rod and a second rod in spaced parallel arrangement on opposite sides of the pipe frames with the forward ends of the rods extended through the delivery end of the washing or spraying unit. By virtue of the special design of the head and with suitable connection to a blower 15, the head will direct blasts of dry air over the surfaces of the carriers for rapid drying by evaporation and for delivery to the loading platform in a more sanitary manner than heretofore possible.

It will be apparent that the structure of the drying unit herein described and illustrated is subject to a large variety of modifications within the limits of the appended claim.

What is claimed is:

A drying head for containers transported by an endless belt through a washing unit, the belt being extended beyond the delivery end of the washing unit; the drying head comprising an elongated body with open bottom, said body comprising an upper chamber and a lower chamber, said upper chamber comprising spaced parallel upper side members of triangular form, a top member disposed over the corresponding edges of said upper side member, said lower chamber comprising spaced parallel end members depending from the ends of said top member, lower side members disposed intermediate the corresponding edges of said end members and said upper side members, a plurality of radially spaced baffles disposed intermediate said lower side members with the center of radiation in said upper chamber, means for supplying air under pressure substantially at the apex of said top member, and means for the reciprocable longitudinal movement of said head above the extended portion of the belt and transversely thereof.

References Cited in the file of this patent

UNITED STATES PATENTS

| | | |
|---|---|---|
| 1,765,996 | Olson | June 24, 1930 |
| 1,819,051 | Wilson et al. | Aug. 18, 1931 |
| 2,016,125 | Snow | Oct. 1, 1935 |
| 2,132,303 | Lathrop | Oct. 4, 1938 |
| 2,137,104 | Zademach | Nov. 15, 1938 |
| 2,250,238 | Smith | July 22, 1941 |
| 2,413,937 | Zademach et al. | Jan. 7, 1947 |
| 2,440,157 | Rousseau | Apr. 20, 1948 |
| 2,523,080 | Webb | Sept. 19, 1950 |
| 2,685,146 | Stevens | Aug. 3, 1954 |